US012691964B2

(12) United States Patent
Reisige et al.

(10) Patent No.: US 12,691,964 B2
(45) Date of Patent: Jul. 28, 2026

(54) METHOD FOR SWITCHING A GEAR RATIO OF A SWITCHABLE GEAR MECHANISM, CONTROL DEVICE AND VEHICLE

(71) Applicant: Robert Bosch GmbH, Stuttgart (DE)

(72) Inventors: Christian Reisige, Tuebingen (DE); Merlin Martin Manewald, Reutlingen (DE); Daniel Baumgaertner, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 520 days.

(21) Appl. No.: 18/251,651

(22) PCT Filed: Oct. 26, 2021

(86) PCT No.: PCT/EP2021/079622
§ 371 (c)(1),
(2) Date: May 3, 2023

(87) PCT Pub. No.: WO2022/100999
PCT Pub. Date: May 19, 2022

(65) Prior Publication Data
US 2023/0406436 A1 Dec. 21, 2023

(30) Foreign Application Priority Data
Nov. 11, 2020 (DE) ..................... 10 2020 214 163.0

(51) Int. Cl.
*B62J 45/411* (2020.01)
*B62J 45/413* (2020.01)
(52) U.S. Cl.
CPC ........... *B62J 45/411* (2020.02); *B62J 45/413* (2020.02)

(58) Field of Classification Search
CPC ...... B62J 45/411; B62J 45/413; B62J 45/421; B62M 2025/006; B62M 6/50; B62M 6/55
See application file for complete search history.

(56) References Cited

U.S. PATENT DOCUMENTS 5,873,426 A * 2/1999 Tabata .................. B60W 10/08
903/910
8,645,013 B2 * 2/2014 Sah ....................... B60W 20/20
903/902
(Continued)

FOREIGN PATENT DOCUMENTS

DE 10 2010 017 412 A1 12/2011
DE 10 2012 107 939 A1 2/2013
(Continued)

OTHER PUBLICATIONS

International Search Report corresponding to PCT Application No. PCT/EP2021/079622, mailed Feb. 10, 2022 (German and English language document) (7 pages).

*Primary Examiner* — Drew J Brown
(74) *Attorney, Agent, or Firm* — Maginot, Moore & Beck LLP

(57) ABSTRACT
A method for switching a gear ratio of a switchable gear mechanism of a vehicle, which includes an electric motor for driving the vehicle, includes: generating a motor torque with the electric motor; determining an upcoming gear change; reducing the amount of the generated motor torque depending on the determined gear change; and changing the gear ratio of the switchable gear mechanism during a predetermined timespan according to the reduction in the amount of the generated motor torque. At least one motor torque pulse is generated by the electric motor during the predetermined timespan.

19 Claims, 5 Drawing Sheets

(56) References Cited

U.S. PATENT DOCUMENTS

| | | | | |
|---|---|---|---|---|
| 9,394,973 | B1 * | 7/2016 | Theobald | F16H 3/0915 |
| 9,724,990 | B2 * | 8/2017 | Hoermandinger | B60K 5/04 |
| 10,513,171 | B2 * | 12/2019 | Mehlis | B60K 17/26 |
| 11,097,722 | B2 * | 8/2021 | Hoshino | B60K 6/36 |
| 11,411,514 | B2 * | 8/2022 | Trawick | H02P 6/10 |
| 12,071,016 | B2 * | 8/2024 | Shapiro | F16F 15/002 |
| 2005/0050974 | A1 * | 3/2005 | Ibamoto | B60W 10/06 |
| | | | | 903/917 |
| 2005/0115346 | A1 * | 6/2005 | Sakamoto | F16H 3/126 |
| | | | | 74/335 |
| 2009/0048747 | A1 | 2/2009 | Stridsberg | |

FOREIGN PATENT DOCUMENTS

| | | |
|---|---|---|
| DE | 10 2012 219 991 A1 | 4/2014 |
| DE | 10 2013 215 783 A1 | 12/2014 |
| DE | 10 2013 214 169 A1 | 1/2015 |
| DE | 10 2017 124 175 A1 | 5/2018 |
| DE | 10 2017 128 147 A1 | 11/2018 |
| DE | 10 2018 128 267 A1 | 5/2019 |
| EP | 2 724 925 B1 | 1/2017 |
| JP | 2009-515769 A | 4/2009 |
| JP | 2017-154722 A | 9/2017 |
| JP | 2019-209969 A | 12/2019 |

* cited by examiner

METHOD FOR SWITCHING A GEAR RATIO OF A SWITCHABLE GEAR MECHANISM, CONTROL DEVICE AND VEHICLE

This application is a 35 U.S.C. § 371 National Stage Application of PCT/EP2021/079622, filed on Oct. 26, 2021, which claims the benefit of priority to Serial No. DE 10 2020 214 163.0, filed on Nov. 11, 2020 in Germany, the disclosures of which are incorporated herein by reference in their entirety.

The present disclosure relates to a method for switching a gear ratio of a switchable gear mechanism of a vehicle. The disclosure also relates to a control device configured so as to carry out the method and to a vehicle having said control device.

BACKGROUND

A hub gear of a bicycle as a vehicle often does not switch under load. In part, such bicycle hub gears can only be switched at a torque of nearly zero on the hub. Two-wheeled vehicles comprising a prime mover, such as electric bikes or e-bikes, typically impart almost permanent torque on the respective hub with the hub gear or the internal gear mechanism during operation. During operation, a sinusoidal driver torque or driver torque is typically superposed with a motor torque, wherein the motor torque is generated, for example, depending on a detected driver torque. The generated motor torque has a time lag compared to a standstill of the pedals or does not abruptly stop. In order for the gear change in the electric bicycle to nevertheless occur, the motor torque is typically briefly reduced or completely switched off for a timespan of 0.5 seconds in the event of a detected or detected gear change desire or a gear change signal. The duration of the motor torque reduction cannot be reduced as desired, because otherwise a gear change can no longer be reliably carried out.

The publication DE 10 2010 017 412 A1 discloses a switching apparatus of a vehicle with an electric motor. The electric motor assists a driving by human force when a gear of a gear shift is set, wherein the switching apparatus comprising a control device, wherein the control device is configured so as to reduce drive torque provided by the electric motor during a gear change of the gear mechanism.

The publication DE 10 2012 219 991 A1 discloses a method for operating a bicycle with an electric auxiliary drive and a gear shift, wherein a switch operation is determined and the electric auxiliary drive is activated such that an output torque is adjusted in order to avoid damage to components of the gear shift.

The publication DE 10 2013 215 783 A1 discloses a bicycle drive for a bicycle having an auxiliary power motor and a multi-stage hub gear, wherein power to the auxiliary power motor is reduced or switched off after activation of a switching device.

The publication DE 10 2012 107 939 A1 discloses a bicycle drive apparatus having a drive assist motor and a microcomputer. A gear mechanism control portion of the microcomputer receives a switch command and instructs a power control portion to stop or reduce the power of the motor.

However, the motor torque reduction proposed by the publications cited above is generally perceived negatively by the driver, because driver assistance by the motor torque is reduced or lacking for a noticeable period of time. It also sometimes results in uncomfortable bucking. In particular in steep terrain, the interruption in power can further lead to an unacceptable speed reduction and cause accidents.

The problem addressed by the present disclosure is to improve a gear switching operation for a vehicle having a drive motor, in particular for an electric bicycle, wherein the vehicle or electric bicycle preferably comprises a switchable gear mechanism in the form of a hub gear.

SUMMARY

The above problem is solved according to the present disclosure according to the features described below.

The present disclosure relates to a method for switching a gear ratio of a switchable gear mechanism respectively a gear shift of a vehicle. The vehicle, in particular an electric bicycle, further comprises an electric motor for driving the vehicle. The switchable gear mechanism, advantageously an internal gear mechanism, respectively the gear shift, in particular arranged on a hub of a wheel or a hub gear, advantageously comprises a switchable planetary gear mechanism. The method begins by generating a motor torque by means of the electric motor. The motor torque can advantageously be generated depending on a detected input or actuation of the driver for the desired propulsion, for example depending on a detected input on an accelerator pedal of the vehicle and/or depending on a detected input on a rotational handle of a handlebar of the vehicle and/or depending on a detected pedaling frequency of the driver on a pedal axle of the vehicle. Furthermore, in a further step, a determination of an upcoming gear change is carried out, wherein in particular an electric gear change signal is generated. The amount of the generated motor torque is then reduced to zero depending on the determined upcoming gear change by activating the electric motor, wherein the amount of the generated motor torque is advantageously reduced, in particular at least briefly, to zero. By reducing the amount of the motor torque generated, the rotational speed of the rotor is in particular also reduced and in particular dropped to zero. The reduction in the amount of the motor torque generated is accomplished by ending the activation of the electric motor or by shutting off the active power to the electric motor or by adjusting the drive or power of the electric motor in order to produce a reduced motor torque. Following the reduction in the amount of generated motor torque, the gear ratio of the switchable gear mechanism is changed or switched during a predetermined timespan. In other words, a further gear of the gear shift is engaged during the predetermined timespan. According to the disclosure, during the predetermined timespan for changing the gear ratio, at least one motor torque pulse is generated by means of the electric motor. Advantageously, the motor torque pulse has the same direction of rotation as the previously generated motor torque for driving the vehicle. The disclosure then results in the advantage that an average torque is greater than the reduced amount of the motor torque during the predetermined timespan for changing or switching the gear ratio; in particular, the average torque is greater than zero during the predetermined timespan due to the motor torque pulse. Thus, even during the predetermined timespan for changing the gear ratio, a power assistance is thus provided to the driver, resulting in reduced bucking of the vehicle during the switching operation. Furthermore, a speed reduction on steep slopes that is unacceptable for electric bicycles is avoided. Advantageously, the at least one motor torque pulse has the same direction of rotation as the previously generated motor torque for driving the vehicle and/or at least one motor torque pulse has a direction of rotation that is opposite to the previously generated motor torque for driving the vehicle. This results in the further advantage that a gear change is reliably carried out, because short-term, load-free phases during the predetermined timespan and due to the generated motor torque pulse result in a rhythmic loading and unloading of the chain, whereby the gear mechanism is briefly stimulated to move back and forth or to vibrate. This vibration assists in the gear change of the switchable gear mechanism, in particular the hub gear, in particular against a motor torque reduced to zero. There is also the advantage that the predetermined timespan can be shortened compared to the prior art. According to the disclosure, there is also the resulting advantage that the predetermined timespan can be extended compared to the prior art, because an average torque resulting from the motor torque pulses is provided to the driver. The extended predetermined timespan further advantageously allows for a reliable, load-free switching or a load-free change of the gear ratio across multiple gear ratios.

In a particularly preferred configuration of the disclosure, the vehicle, in particular an electric bicycle, additionally comprises a pedal axle or crankshaft. The pedal axle or crankshaft is connected to cranks and advantageously to pedals. The vehicle is thus in particular configured so as to convert pedal forces of a driver on the pedals into a rotation of the pedal axle and to generate a driver torque or pedal torque on the pedal axle as well as a rotation of the pedal axle for driving the vehicle. In this configuration, the method additionally comprises a detection of a rotational position or rotational angle position of the pedal axle and/or a detection of at least one position of a crank on the pedal axle and/or a driver torque and/or a speed of the pedal axle. Then, a time point for reducing the generated motor torque is determined depending on the detected rotational angle position of the pedal axle and/or the detected position of the crank and/or the detected driver torque and/or the detected speed of the pedal axle. The pedaling forces during pedaling i.e. during the rotational movement of the pedal typically vary periodically over time and disappear in the range of the upper or lower dead point. The determined time point for reducing the generated motor torque represents in particular a crank position with a predetermined angular offset to this upper and/or lower point or dead point of a crank rotation about the pedal axle. In other words, the determined time point represents a rotational angle position of the pedal axle or a position of the crank at which the driver typically does not apply any or only applies a reduced pedaling force to the pedals, because the pedals are substantially perpendicular. The rotational angle positions with abating detected driver torque, represented by the determined time point, are typically in the range of the lower and/or upper point of a rotation of the cranks about the pedal axle relative to the vehicle's vertical axis of rotation, because the pedals are substantially perpendicular. The reduction of the generated motor torque is subsequently carried out additionally depending on the determined time point. Alternatively or additionally, the change in the gear ratio of the switchable gear mechanism in this configuration is additionally carried out depending on the determined time point. This configuration advantageously determines the time point for reducing the generated motor torque and changing the gear ratio depending on the pedaling frequency or cadence of the driver. In this configuration, a switch under load is reliably avoided, that is to say, despite the driver's applied pedaling forces, an at least nearly load-free switching is enabled. In this particularly preferred configuration, in other words, a load-free state in the future is predicted, wherein the actual sensory detection of a rotational angle position of the pedal axle and/or the position of the crank at the lower and/or upper dead point is preferably avoided. The determined time point of the load-free state in the future can in particular be reliably predicted depending on the detected driver torque, because the pedaling behavior of the driver normally does not abruptly discontinue within a crank revolution or the pedaling force does not typically increase abruptly shortly before switching, in particular when the time point is additionally determined depending on the detected pedaling frequency or rotation speed of the pedal axle or pedaling frequency. This results in the advantage that a smoother and time-coordinated or exact driving of the electric motor to reduce the generated motor torque can be carried out so that the driver is hardly aware of the switching or the change in the gear ratio on the pedals. Furthermore, advantageously, the rotational angle position of the pedal axle and/or the position of the cranks can be detected more imprecisely, thereby reducing costs.

In a preferred embodiment of the disclosure, during the predetermined timespan, two, three, or four motor torque pulses are generated. In this embodiment, the average torque resulting from the generated motor torque pulses can be increased during the predetermined timespan, and thus the driver can be better power-assisted with reliable change in the gear ratio.

Advantageously, during the predetermined timespan, the generated motor torque pulses result in an average torque having an amount deviation of less than or equal to 50 percent of an amount of the generated engine torque immediately prior to the reduction. Particularly preferably, the deviation of the average torque resulting from the generated motor torque pulses during the predetermined timespan is less than or equal to 30 percent of the amount of the motor torque generated immediately prior to the reduction. In this further embodiment, the driver is advantageously better power-assisted with a reliable change in the gear ratio.

In a further development, during the predetermined timespan, the sum of the at least two reduction timespans or reduction durations in which the motor torque is reduced is less than or equal to the sum of the at least one pulse duration of the generated motor torque pulse. In other words, during the predetermined timespan, the temporal summation of the at least one pulse duration of the motor torque pulse is greater than or equal to the temporal summation of the reduction timespans in which the motor torque is reduced, in particular to zero. With this further development, the average torque resulting from the generated motor torque pulses is additionally increased during the predetermined timespan. The driver is better power-assisted with a reliable change in the gear ratio.

In a further configuration, the amount of motor torque pulses generated during the predetermined timespan remains the same. This configuration advantageously results in an expected behavior of the vehicle for the driver.

In a further configuration, the amount of motor torque pulses generated during the predetermined timespan varies. This configuration advantageously results in an increased average torque during the predetermined timespan as well as a more reliable change in the gear ratio.

In another further development, the duration of the predetermined timespan and/or the number of engine torque pulses generated are adjusted depending on a detected speed of the vehicle and/or depending on a detected pedaling frequency of the driver and/or depending on a detected currently set gear ratio. This increases the reliability of the change in gear ratio even in extreme conditions. Furthermore, in this further development, the method can be optimally adapted to different driving situations.

It can further be provided that the determination of the upcoming gear change is carried out by means of a gear change button, which is configured so as to detect an operator activation or input. The detected input represents a desire to change the gear ratio. In other words, based on an activation of a gear change button, for example a shift lever of the gear shift, the upcoming gear change is determined or the electric switch signal is generated. This type of determination of the upcoming gear change is advantageously fast and efficient.

In an alternative configuration, the upcoming gear change is detected or determined by means of a gear change detection sensor on a Bowden cable of the switchable gear mechanism and/or on the switchable gear mechanism. The gear change detection sensor is configured so as to sense an upcoming gear change through a motion of the Bowden cable. This type of determination of the upcoming gear change is advantageously easily transferable to all types of switchable gear mechanisms and gear shift levers or gear change buttons.

In a further embodiment, the upcoming gear change is determined automatically or semi-automatically based on a driver torque of the pedal axle detected by a torque sensor and/or a driver pedaling frequency detected by a speed sensor, or the switch signal generated. Advantageously, a required gear change or a gear change desire is detected or a gear change signal is generated when a brief pedal break of the driver is detected by means of the torque sensor and/or the speed sensor and/or a first threshold for driver torque is detected and/or a second threshold for the speed of the pedal axle is detected. This type of determination of the upcoming gear change is advantageously easily transferable to all types of switchable gear mechanisms and shift levers. In addition, in this embodiment, an additional sensor is not needed in order to determine the upcoming gear change, because, for example, electric bicycles as a vehicle typically have a torque sensor in order to sense the driver torque on the pedal axle and/or a speed sensor.

In a further optional configuration of the disclosure, information is displayed to the driver at the determined time point for reducing the generated motor torque and/or at the predetermined timespan for changing the gear ratio. For example, the displayed information can visualize the upcoming determined time point for reducing the generated motor torque and/or the duration of the predetermined timespan and/or a remaining duration of the predetermined timespan so that the driver understands the process well and is prepared for the individual process steps or types of activation.

The disclosure also relates to a control device for the vehicle. The control device is configured so as to carry out the method according to the disclosure for switching a gear ratio of the switchable gear mechanism.

The disclosure further relates to a vehicle, in particular to an electric bicycle, wherein the vehicle comprises a switchable gear mechanism, an electric motor for driving the vehicle, and the control device according to the disclosure.

BRIEF DESCRIPTION OF THE DRAWINGS

Further advantages are derived from the following description of embodiment examples with reference to the figures.

DETAILED DESCRIPTION

Figure 1:
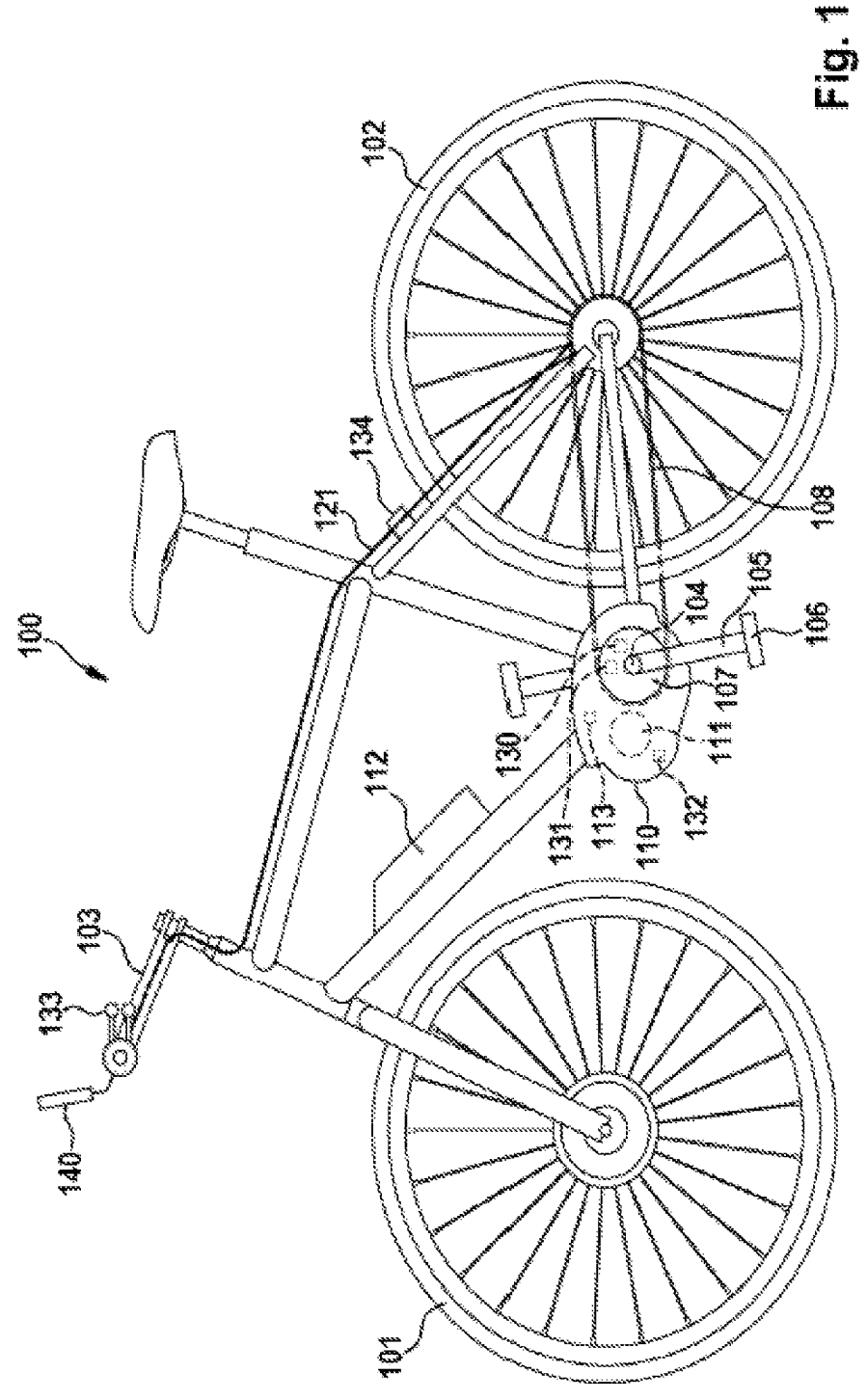
FIG. 1: Electric bicycle as vehicle

FIG. 1 schematically shows an electric bicycle as the vehicle 100. The vehicle 100 comprises a front wheel 101 and a rear wheel 102 as wheels, as well as a handlebar 103. Moreover, the vehicle 100 comprises a pedal axle 104, which is connected to a pedal 106 on both sides by means of a crank 105. In the area of the pedal axle 104, a drive unit 110 is arranged with an electric motor 111 as the drive motor. Alternatively, the drive unit 110 can also be arranged with the electric motor 111 on the wheel hub of the front wheel 101 or on the wheel hub of the rear wheel 102. The electric motor 111 is powered i.e. provided with electric current by a battery 112. For power transmission, the vehicle 100 comprises an output pinion 107 or a sprocket on the drive unit 110. The output pinion 107 is connected to the wheel hub of the rear wheel 102 by way of a connecting element 108, for example a chain or a belt. A gear shift respectively a switchable gear mechanism 120 is arranged on the wheel hub of the rear wheel 102, for example having three to fourteen different switchable gear ratios. Accordingly, the switchable gear mechanism 120 is configured as a hub gear in this embodiment. The switchable gear mechanism 120, in a simple embodiment, is advantageously configured so as to be switched by operator input by means of a gear shift lever or by means of a gear change button 133 and by means of the Bowden cable 121. A change in the gear ratio of the switchable gear mechanism 120 can be done manually, but alternatively can also be semi-automatic or automatic. The optional automatic generation of a gear change signal is dependent on operating parameters, for example the speed of the vehicle, and/or depending on driving parameters of the driver, for example the detected driver torque and/or the pedaling frequency of the driver. The optional semi-automatic generation of a gear change signal is dependent on operating parameters, such as vehicle speed, and/or driver travel parameters, such as the detected driver torque and/or pedaling frequency, as well as a detected input from the driver of the vehicle 100 representing a desire to change the gear ratio and gear. The driver torque applied by the driver to the pedal axle 104 and/or the generated motor torque by the electric motor 111 is first transmitted to the output pinion 107 and to the switchable gear mechanism 120 on the wheel hub of the rear wheel 102 by way of the connecting element 108. Furthermore, the vehicle 100 comprises optional sensors: A torque sensor 130 for sensing driver torque, a speed sensor 131 for sensing the speed of the pedal axle 104 or the cadence of the driver, and a rotational angle sensor 132 for sensing the angular position or the position of the crank 105 with respect to its rotation about the pedal axle 104. As a sensor, a gear shift lever or gear change button 133 is also arranged on the handlebar 103 of the vehicle 100. The gear change button 133 is configured so as to sense an input of a driver to select or change a gear ratio. Furthermore, the vehicle 100 can comprise an optional gear change detection sensor 134 configured so as to sense a movement of the Bowden cable 121 to the switchable gear mechanism 120 as a switch signal from the driver. In addition, the vehicle can have a speed sensor (not shown) and/or can determine the speed of the vehicle based on location data, wherein for example the location data is determined by radio codes of a global navigation satellite system (e.g. GPS, Galileo, GLONASS, Beidou) by means of an antenna. Furthermore, the vehicle 100 optionally comprises a display apparatus 140 or an HMI or a display. The display apparatus 140 is configured so as to display information to the driver of the vehicle. The drive unit 110 of the vehicle 100 further comprises a control device 113. The control device 113 is configured so as to activate the electric motor 111 and carry out a method according to the present disclosure for switching a gear ratio of the switchable gear mechanism 120.

Figure 2:
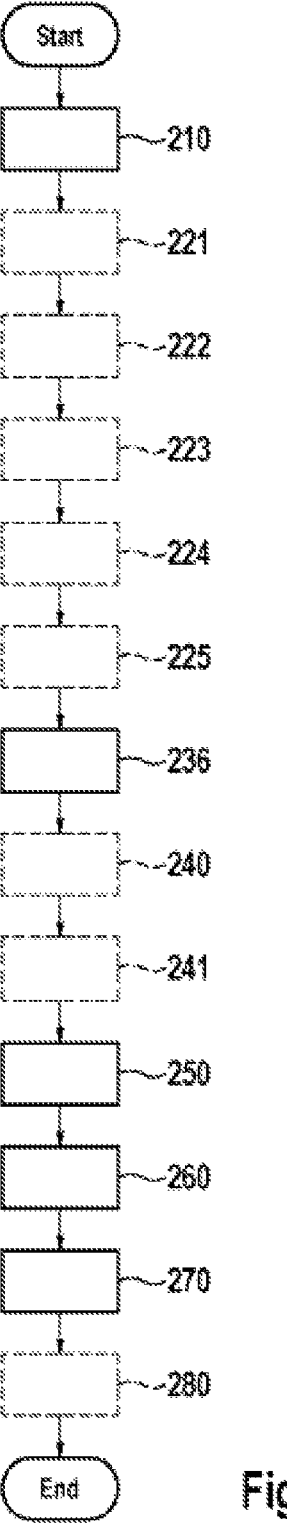
FIG. 2: Flowchart of the method as block diagram

FIG. 2 schematically shows a flowchart of the method as a block diagram. First, in step 210, a motor torque is generated by means of the electric motor of the vehicle 100. In the case of an electric bicycle as the vehicle 100, advantageously the motor torque is generated depending on a detected driver torque and/or a detected driver pedaling frequency or cadence. In the optional step 221, the driver torque is detected. The sensing 221 is accomplished in particular by means of a torque sensor, for example, based on the inverse magnetostrictive effect on a hollow shaft arranged coaxially to the pedal axle 104. In the optional step 222, the driver's pedaling frequency or cadence is detected, in particular by a speed sensor configured so as to sense the revolution of the pedal axle 104 based on the rotation of the cranks at least once per revolution of a crank 105. Moreover, optionally, not shown in FIGS. 1 and 2, an angular position of the cranks during rotation about the pedal axle or the angular position of the rotation of the pedal axle 104 can be detected. Furthermore, optionally, a detection 223 of a speed of the vehicle can be carried out. For example, the speed of the vehicle can be detected by a speed sensor or at least one reed sensor on the front wheel 101 and/or the rear wheel 102. Alternatively or additionally, the speed of the vehicle can be determined depending on received radio codes of a global navigation satellite system (e.g. GPS, Galileo, GLONASS, Beidou) by means of a location sensor or antenna. In addition, in the optional step 224, an input of the driver is detected by means of the gear change button 133, which represents a gear change request. Alternatively, in the optional step 225, by means of a gear change detection sensor 134 on a Bowden cable 121 of the switchable gear mechanism 120 and/or a gear change detection sensor 134 on the switchable gear mechanism 120, a movement of the Bowden cable or a movement of gearwheels or a chain can be detected, each representing an upcoming gear change. In step 236, the upcoming gear change is determined. The determination 236 of the upcoming gear change is preferably determined depending on the input detected in step 224. Alternatively or additionally, the upcoming gear change is carried out based on the movement detected in step 225 and/or based on the driver torque detected in step 221 and/or based on the pedaling frequency of the vehicle detected in step 222 and/or based on the speed of the vehicle detected in step 223. Particularly preferably, in the optional step 240, a rotational angle position of the pedal axle 104 and/or at least one position of the crank 105 is determined or detected, and then, in step 241, a time point for reducing the generated motor torque depending on the detected rotational angle position of the pedal axle 104 and/or the detected position of the crank 105 is determined. Thereafter, in step 250, the amount of generated motor torque is at least reduced depending on the determined upcoming gear change. Preferably, this reduction 260 in the amount of the generated motor torque is additionally carried out depending on the determined time point. After reducing the amount of generated motor torque, in step 260, a gear ratio of the switchable gear mechanism 120 is changed during a predetermined timespan. The change 260 of the gear ratio of the switchable gear mechanism can additionally occur depending on the determined time point. According to the present disclosure, during the predetermined timespan for changing the gear ratio, in step 270, at least one motor torque pulse is generated by means of the electric motor. Advantageously, in step 270, two, three, or four motor torque pulses are generated. By generating 270 the motor torque pulses during the predetermined timespan, an increased average torque results. In particular, the average torque has an amount deviation of less than or equal to 50 percent of an amount of the generated motor torque immediately prior to the reduction. Advantageously, the sum of the at least two reduction timespans present during the predetermined timespan in which the motor torque is reduced is less than or equal to the sum of the at least one pulse duration of the motor torque pulse generated in step 270. The amount of motor torque pulses generated during the predetermined timespan preferably remains the same. Alternatively, the amount of motor torque pulses generated varies during the predetermined timespan. The duration of the predetermined timespan and/or the number of motor torque pulses generated can optionally be adjusted depending on the detected speed of the vehicle and/or depending on the driver's detected pedaling frequency and/or depending on the currently set gear ratio of the switchable gear mechanism. Furthermore, in the optional step 280, information can be displayed to the driver at the determined time point for reducing the generated motor torque and/or at the predetermined timespan for changing the gear ratio.

Figure 3:
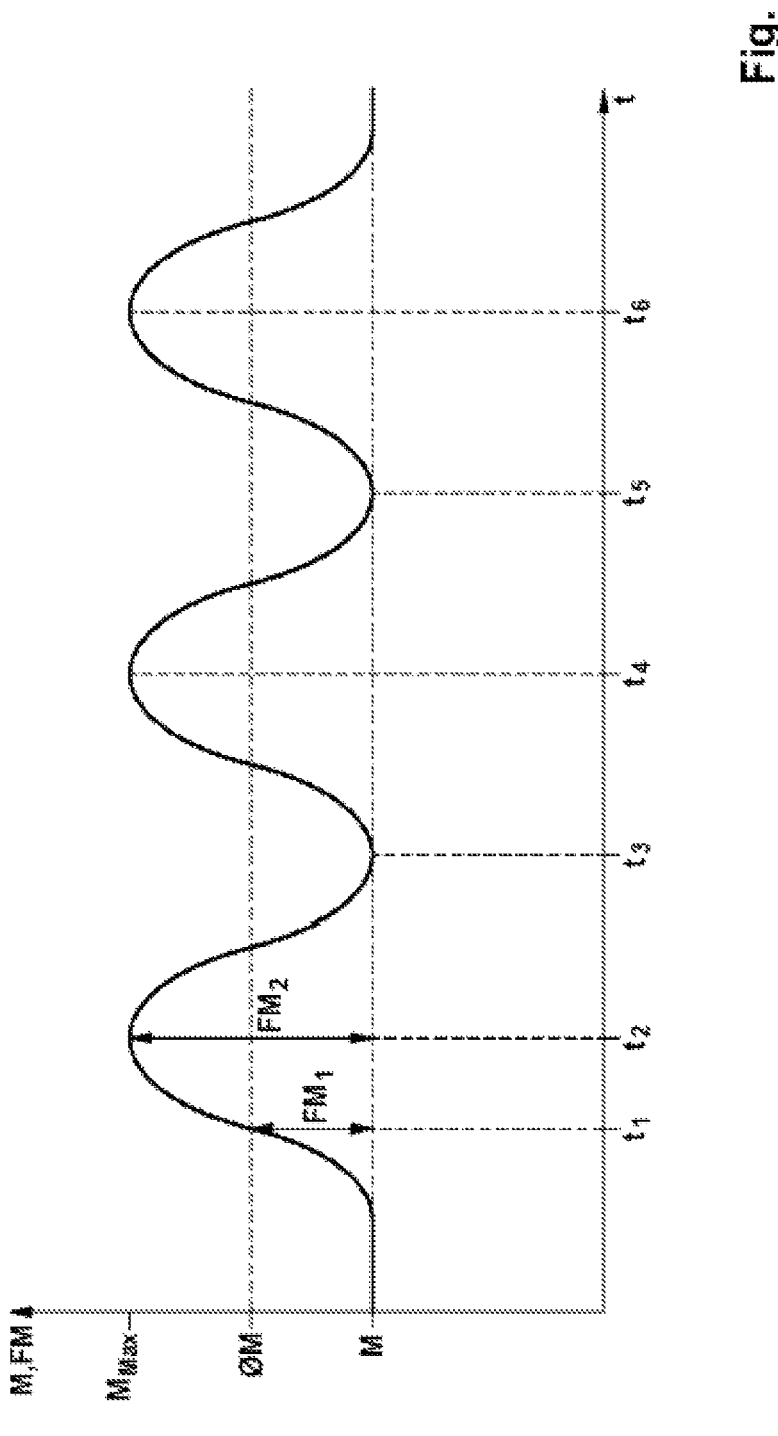
FIG. 3: Chart of torque curve in operation of an electric bicycle

In FIG. 3, a diagram of a typical torque curve in operation of an electric bicycle during travel is shown schematically, wherein no switching operation is present. The driver torque FM applied to the pedals by the driver, periodically changing by pedal forces, is superposed on a motor torque M generated by the electric motor. In other words, the motor torque M and the driver torque are summed at least at one output, in particular the output pinion 107 of the drive unit 110, and the sum of these torques is transferred to the connecting element 108 and the rear wheel 102. This results in an average torque ØM. The motor torque M can be adjusted or generated depending on the driver torque FM detected by a torque sensor, wherein this generation is in particular based on a driver torque ØFM averaged over multiple periods. Accordingly, the curve of the generated motor torque M, as shown in FIG. 3, is typically substantially more constant than the curve of the detected driver torque FM. To illustrate the above, multiple time points t1, t2, t3, t4, t5, and t6 are shown, at which the substantially equal amount of motor torque M is respectively generated, for example. The driver torque applied to the pedal axle by the driver is based on its pedal forces on the right and left pedals. For example, it increases from time point t1 with the driver torque FM1 applied to time point t2 with the driver torque FM2 applied, wherein a maximum of the driver torque FM applied is achieved at time point t2. From time point t2 to time point t3, the driver torque applied drops to zero, because at time point t3 the pedals are typically in the range of the upper and lower points with respect to a pedal rotation about the pedal axle or crankshaft. The position of the pedals at the upper and/or lower point, also called dead point, does not allow the driver to transmit a high pedal force, because he or she is typically seated above the pedal axle or the pedal forces are applied substantially from above onto the pedals. From the position of the pedals at the upper and/or lower points, the driver torque typically increases continuously until a maximum amount of the driver torque FM is applied at time point t4 on pedals in the horizontal position. The driver torque then falls continuously between the time point t4 and the time point t5 again until the time point t5, wherein a driver torque is again applied approximately with the amount zero at the time point t5. A full rotation of a pedal, or a full revolution of the pedal axle, corresponds to the timespan from the time point t2 to the time point t6, at which a maximum amount of the driver torque FM is again applied. In other words, two minima and two maxima of driver torque FM are present when the driver pedals evenly per full revolution of the pedal axle, or during the full revolution of a respective pedal. Typically, 60 to 120 revolutions per minute are achieved by the driver. The driver torque FM applied and the driver's pedaling frequency applied or the generated speed at the pedal axle 104 are based on the current gear ratio between the pedal axle and the rear wheel 102. The summed torque from the driver torque FM and the generated motor torque M is advantageously transmitted to the rear wheel 102 by way of at least one switchable gear mechanism 120. Consequently, switching the switchable gear mechanism results in jumps in the torque curve.

Figure 4:
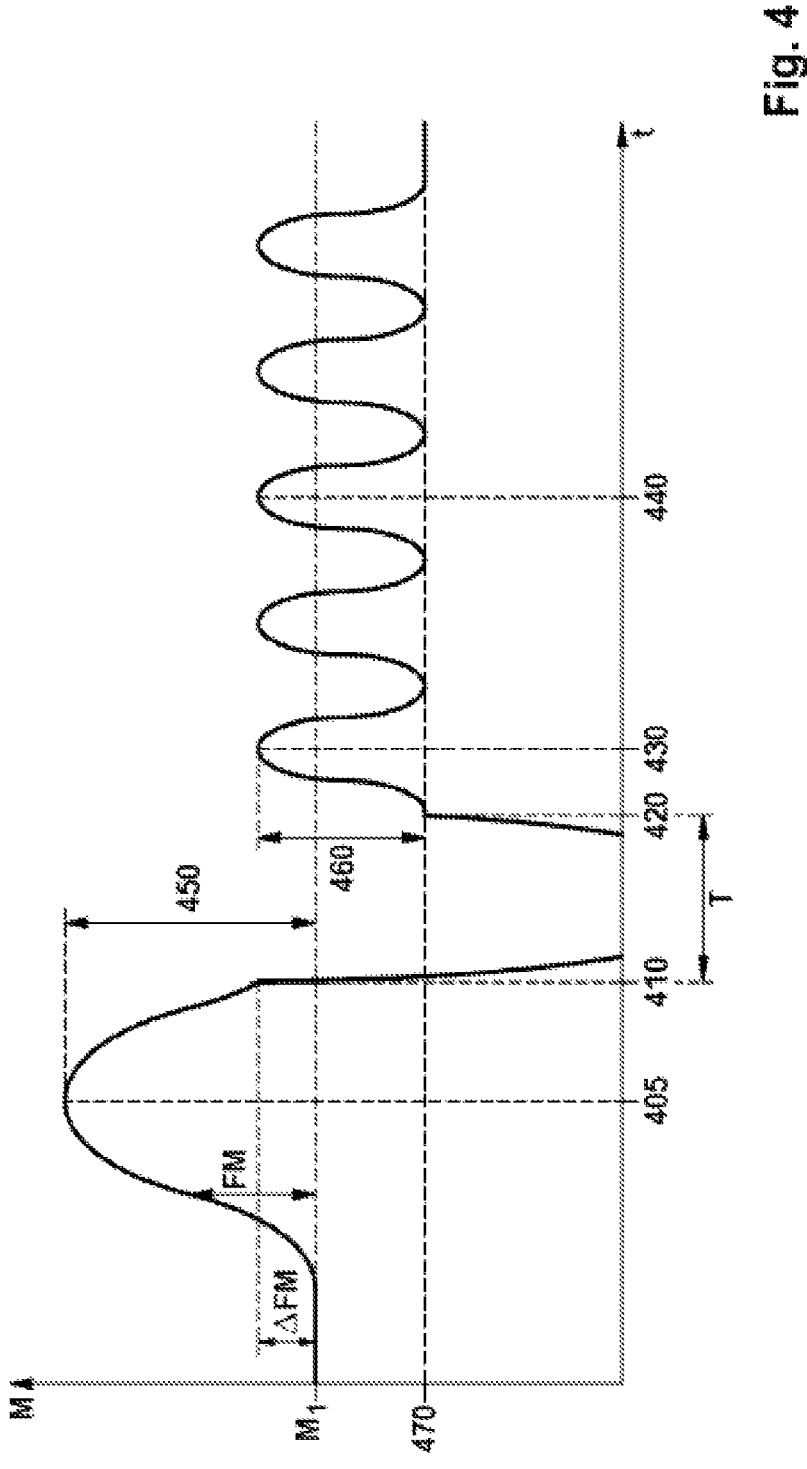
FIG. 4: Chart of torque curve when switching according to the prior art

FIG. 4 schematically shows a plot of the torque curve when switching according to the prior art. Some switchable gear mechanisms 120 cannot be switched at a continuously applied torque, especially in the case of some hub gears. For example, if a desired gear change has been determined by the driver by means of a shift lever operation, then, due to the applied motor torque and the periodically imparted driver torque, the switch cannot be immediately be done. Consequently, in the prior art, the method waits until, for example, a driver torque FM less than or equal to a threshold ΔFM or a position of the cranks in the area of the upper and lower points is detected by means of the torque sensor connected to the pedal axle 104. Then, at time point 410, the generated motor torque is reduced from the amount M1 to zero. During the predetermined timespan T running from time point 410 to time point 420 with the reduced motor torque, a gear ratio is changed or switched. For example, the predetermined timespan is 0.5 seconds. No motor torque is generated between time point 410 and time point 420 in this embodiment example. Further, at time point 410, the pedals are in the range of the upper and lower points with respect to the rotation of the pedals about the pedal axle 104 such that no or little operator torque can be applied to the pedals 106 by the operator. As a result, a load-free switching of the switchable gear mechanism 120 during the predetermined timespan T is enabled. At time point 420, that is to say, after the predetermined timespan T, again a motor torque is generated, for example with the amount 470. Following the switch, the driver torque FM applied after the time point 420 has a different maximum amount 460 than the maximum amount 450 at the time point 405 prior to the switch due to the change in the gear ratio. Accordingly, in the downshift, for example, an increased pedaling frequency results, as shown in FIG. 4. In other words, in the example of FIG. 4, a duration of a full revolution of the pedal axle between time points 430 and 440 after switching is shortened due to the reduced gear ratio.

Figure 5:
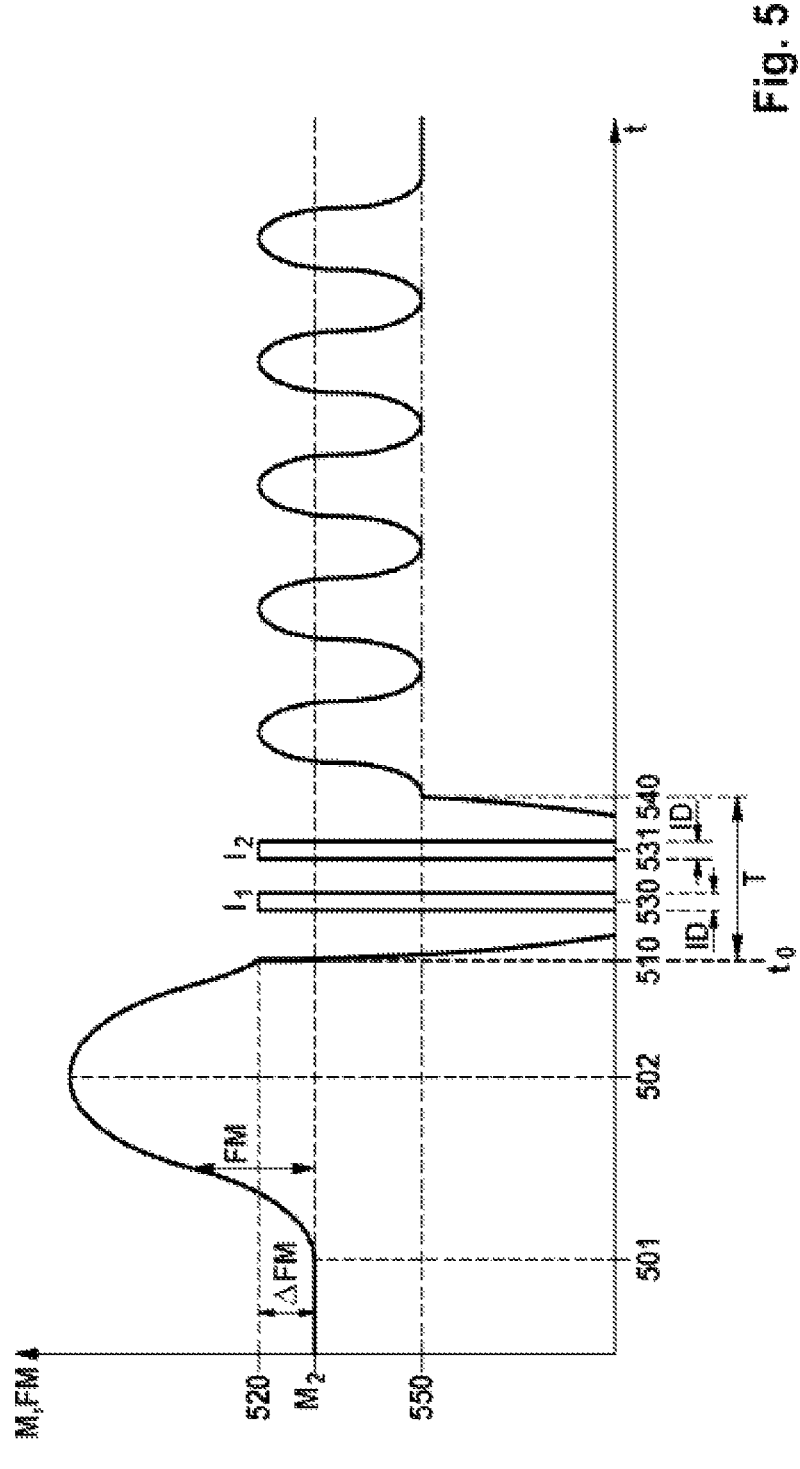
FIG. 5: Example of a torque curve during switching according to the disclosure

FIG. 5 schematically shows an example of a torque curve when switching according to the disclosure. First, until time point 510, the driver applies the driver torque FM to the pedals 106 or the pedal axle 104 and, by means of the electric motor 111, the motor torque is generated at an amount M2. If a desired gear change has been determined in step 430, the driver torque cannot typically be immediately switched due to the applied motor torque and periodically imparted driver torque. Thus, the method waits until, for example, a driver torque FM less than or equal to a threshold ΔFM is detected. It can alternatively be advantageously provided that the time point 510 or t0 for reducing the generated motor torque is determined, for example, depending on the detected driver torque and/or the detected speed of the pedal axle. The determination 241 of the time point 510 or t0 for reducing the generated motor torque M is carried out, for example, at the time point 501 of a last zero pass of the detected driver torque or at the time point 502 of a last pass of a maximum of the detected driver torque or at another time point of the curve of the detected driver torque, i.e. prognostically, depending on the detected driver torque and/or the detected speed of the pedal axle. Then, in step 250, the generated motor torque is reduced, in particular to zero. In other words, advantageously, the activation of the electric motor is adjusted so that the electric motor 111 does not initially generate a motor torque after the time point 510 at the beginning of the predetermined timespan T. According to the present disclosure, subsequently, during the predetermined timespan T, according to the reduction 250 in the amount of generated motor torque M, the gear ratio of the switchable gear mechanism 120 is changed and at least one motor torque pulse I1 is generated by step 270 by means of the electric motor. In the example of FIG. 5, two motor torque pulses I1, I2 are generated during the predetermined timespan T. These are a motor torque pulse I1 at time point 530 and a further motor torque pulse I2 at time point 531. In this embodiment example, the motor torque pulses I1, I2 have a same pulse width ID and an equal amount, wherein the pulse amount corresponds to the amount of the sum consisting of the amount M2 of the generated motor torque and the applied driver torque prior to step 250 at time point 510. The number of pulses during the predetermined timespan T, the pulse width ID, and an amount of a motor torque pulse can be varied, for example, depending on the current or future gear ratio, or depending on the speed of the vehicle. The generated motor torque pulses I1, I2 increase the average torque during the predetermined timespan T and additionally assist in changing the gear ratio, because, due to the vibration of the components in the powertrain triggered by the motor torque pulses I1, I2, the mechanical movement when switching the switchable gear mechanism is promoted. After the expiration of the predetermined timespan, T, a motor torque is generated again from the time point 540, wherein the amount 550 can deviate from or be the same as the amount M2 of the generated motor torque before the reduction 250 at the time point 510. For example, in the embodiment example of FIG. 5, a downward curve from the amount M2 to the amount 550 of the generated motor can be provided starting at the time point 540 (not shown).

The invention claimed is:

1. A method for switching a gear ratio of a switchable gear mechanism of a vehicle having an electric motor for driving the vehicle, the method comprising:
   generating a motor torque with the electric motor;
   determining an upcoming gear change;
   initiating the gear change by reducing the generated motor torque at a beginning of a predetermined gear change timespan;
   changing the gear ratio of the switchable gear mechanism during the predetermined gear change timespan after the reduction in the generated motor torque; and
   generating at least one motor torque pulse with the electric motor during the predetermined gear change timespan.

2. The method according to claim 1, wherein the vehicle includes a pedal axle associated with cranks, the method further comprising:

sensing at least one of (i) a rotational angle position of the pedal axle, (ii) at least one position of a crank, (iii) a driver torque, (iv) and a speed of the pedal axle; and determining a time point for the beginning of the predetermined gear change timespan depending on the sensed at least one of the rotational angle position of the pedal axle, the at least one position of the crank, the driver torque, and the speed of the pedal axle, wherein reducing the amount of the generated motor torque depends on the determined time point, and/or changing the gear ratio of the switchable gear mechanism depends on the determined time point.

3. The method according to claim 2, further comprising:

displaying information to the driver at the determined time point for reducing the generated motor torque and/or at the predetermined gear change timespan for changing the gear ratio.

4. The method according to claim 1, wherein the generating of the at least one motor torque pulse includes generating two, three, or four motor torque pulses during the predetermined gear change timespan in order to change the gear ratio.

5. The method according to claim 1, wherein, during the predetermined gear change timespan, the generated motor torque pulses result in an average torque having an amount deviation of less than or equal to 50 percent of an amount of the generated motor torque immediately prior to the reduction.

6. The method according to claim 1, wherein, during the predetermined gear change timespan, a sum of at least two reduction timespans in which the motor torque is reduced is less than or equal to a sum of at least one pulse duration of the generated at least one motor torque pulse.

7. The method according to claim 1, wherein an amount of motor torque pulses generated during the predetermined gear change timespan remains the same.

8. The method according to claim 1, wherein an amount of motor torque pulses generated during the predetermined gear change timespan varies.

9. The method according to claim 1, wherein a duration of the predetermined gear change timespan and/or a number of motor torque pulses generated in the at least one motor torque pulse are adjusted depending on (i) a detected speed of the vehicle, (ii) a detected pedaling frequency of a driver, and/or (iii) a detected currently set gear ratio of the switchable gear mechanism.

10. The method according to claim 1, wherein the determination of the upcoming gear change includes detecting an operator input on a gear change button.

11. The method according to claim 1, wherein the determination of the upcoming gear change is made using a gear change detection sensor on at least one of a Bowden cable of the switchable gear mechanism and the switchable gear mechanism.

12. The method according to claim 1, wherein the determination of the upcoming gear change is made automatically or semi-automatically depending on a driver torque of the driver detected by a torque sensor and/or via a driver pedaling frequency detected by a speed sensor.

13. A control device for the vehicle, wherein the control device is configured to execute the method for switching the gear ratio of the switchable gear mechanism according to claim 1.

14. The method according to claim 1, wherein none of the torque generated by the electric motor during the predetermined gear change timespan is a negative torque.

15. A vehicle comprising:

a switchable gear mechanism;

an electric motor configured to drive the vehicle; and a control device configured to operate the vehicle to:

generate a motor torque with the electric motor;

determine an upcoming gear change;

initiate the gear change by reducing the generated motor torque at a beginning of a predetermined gear change timespan; and change a gear ratio of the switchable gear mechanism during the predetermined gear change timespan after the reduction in the generated motor torque; and generate at least one motor torque pulse with the electric motor during the predetermined gear change timespan.

16. The vehicle according to claim 15, wherein the vehicle is an electric bicycle.

17. The vehicle according to claim 15, wherein none of the torque generated by the electric motor during the predetermined gear change timespan is a negative torque.

18. A method for switching a gear ratio of a switchable gear mechanism of a vehicle having an electric motor for driving the vehicle, the method comprising:

generating a motor torque with the electric motor;

determining an upcoming gear change;

initiating the gear change by reducing the generated motor torque at a beginning of a predetermined gear change timespan;

changing the gear ratio of the switchable gear mechanism during the predetermined gear change timespan after the reduction in the generated motor torque; and generating at least one motor torque pulse with the electric motor during the predetermined gear change timespan such that an average torque during the predetermined gear change timespan is greater than the reduced generated motor torque at the beginning of the predetermined gear change timespan.

19. The method according to claim 18, wherein none of the torque generated by the electric motor during the predetermined gear change timespan is a negative torque.

* * * * *